No. 618,195. Patented Jan. 24, 1899.
M. ZACK.
BICYCLE ATTACHMENT.
(Application filed Dec. 31, 1897.)
(No Model.)
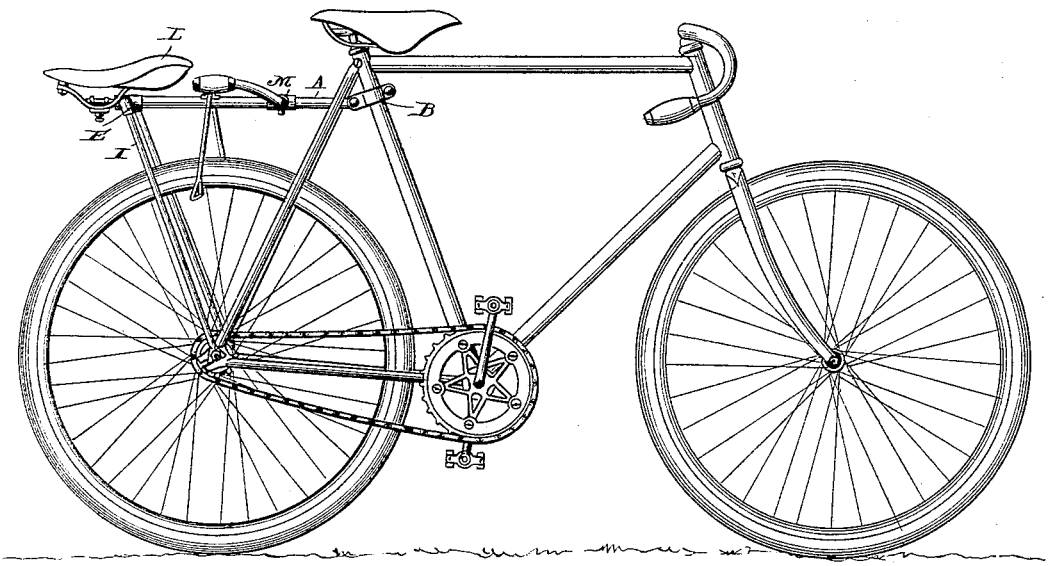
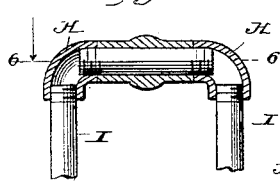
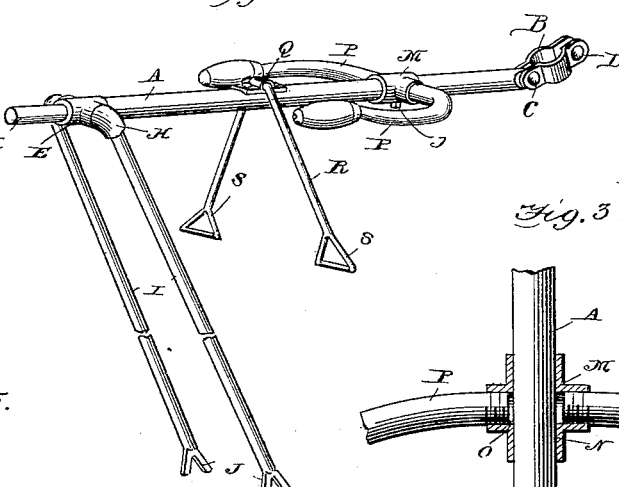
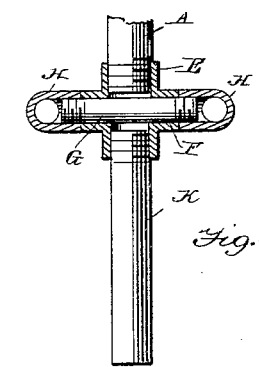
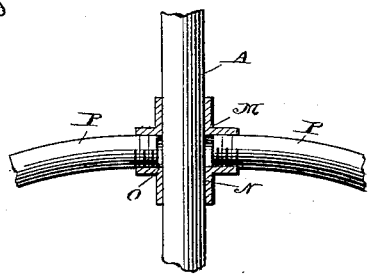
Witnesses
Inventor
Marshall Zack.

UNITED STATES PATENT OFFICE.

MARSHALL ZACK, OF STREATOR, ILLINOIS.

BICYCLE ATTACHMENT.

SPECIFICATION forming part of Letters Patent No. 618,195, dated January 24, 1899.

Application filed December 31, 1897. Serial No. 664,989. (No model.)

*To all whom it may concern:*

Be it known that I, MARSHALL ZACK, a citizen of the United States, residing at Streator, in the county of La Salle and State of Illinois, have invented a new and useful Bicycle Attachment, of which the following is a specification.

This invention relates to improvements in bicycles, and particularly to children's seats therefor; and the object of the invention is to provide a simple and improved seat attachment which may be readily positioned upon a bicycle without altering the construction of the latter.

My invention further consists in the improved construction, arrangement, and combination of parts hereinafter fully described, and afterward specifically pointed out in the appended claims.

In order to enable others skilled in the art to which my invention most nearly appertains to make and use the same, I will now proceed to describe its construction and operation, reference being had to the accompanying drawings, forming part of this specification, in which—

Figure 1 is a side elevation of a bicycle having my seat attachment positioned thereon. Fig. 2 is a perspective view of the attachment removed from the bicycle. Fig. 3 is a horizontal longitudinal sectional view through the sliding head of the handle-bars. Fig. 4 is a vertical transverse sectional view through the coupling-head by means of which the supporting-rods are pivoted to the horizontal bar. Fig. 5 is a sectional view on the line 6 6 of Fig. 4, looking in the direction indicated by the arrow and showing the saddle-post in position.

Like letters of reference mark the same parts wherever they occur in the various figures of the drawings.

Referring to the drawings by letters, A indicates the horizontal bar of the attachment, which at its inner end is clamped to the rear upright of the bicycle-frame through the medium of the clamping members B, which are adapted to embrace the upright, the same being secured to the bar by a bolt C, which passes therethrough, and held in position upon the upright by the bolt D. The outer end of the horizontal bar is screw-threaded to engage the screw-threaded longitudinally-extending passage formed in the coupler E, said coupler having a transversely-extending passage F, which intersects the longitudinal passage, as illustrated in Fig. 5. The rod G is positioned in the transversely-extending passage of the coupler and is screw-threaded upon its respective ends to receive the upper ends of the downwardly-inclined collars H, the supporting-rods I being secured in the lower ends of said collars through the medium of screw-threads, said supporting-rods extending downwardly on opposite sides of the rear wheel and having their lower forked ends J engaging the axle of said wheel, the same being secured by the nuts upon said axle. By means of the above construction the supporting-rods may be adjusted according to the particular bicycle to which the attachment is to be applied.

K is the seat-rod, which is screw-threaded on its inner end to engage the longitudinal passage of the coupler E on the opposite side of the rod G, said seat-rod having the saddle L.

The handle-bar head M is formed with the longitudinal passage N to receive the horizontal bar A, so that said head is movable longitudinally thereon, and with the transversely-extending passage O, which intersects the longitudinal passage and is screw-threaded to receive the screw-threaded ends of the handle-bars P, so that said bars may be raised or lowered, as well as adjusted longitudinally. A set-screw N' is provided for holding the head at the desired adjustment upon the bar A.

Q is a clamping-plate which secures the V-shaped foot-rest R upon the bar, the legs of said foot-rest extending downwardly on opposite sides of the wheel and provided at their lower ends with stirrups S to receive the feet of the child. The foot-rest may be swung toward or away from the child to adjust the same for children of different sizes.

From the above description it will be seen that I have produced a very simple attachment which may be readily positioned upon bicycles of different makes, the same having adjustable handle-bars and foot-rest.

While I have illustrated and described the best means for carrying out my invention, I do not wish to be understood as restricting myself to the exact details of construction shown, but hold that any slight changes such as might suggest themselves to the ordinary mechanic would properly fall within the limit and scope of my invention.

Having thus fully described my invention, what I claim as new, and desire to secure by Letters Patent of the United States, is—

1. The combination with a bicycle, of a bar attached at one end to the frame thereof, by means of a clamp to which said bar is pivoted, supporting-rods pivotally connected at their upper end to the opposite end of said bar and at their lower ends engaging the axle of the wheel, handle-bars adjustable longitudinally upon said bar, foot-rests pivoted to and depending from said bar, and a seat also carried by the bar, substantially as set forth.

2. The combination with a bicycle, of a bar, attached at one end thereto, a coupling-head, having longitudinally and transversely extending, intersecting passages, the opposite end of the bar being positioned in the longitudinal passage, a rod positioned in the transversely-extending passage and screw-threaded at its respective ends, supporting-rods, connected at their upper ends to the respective ends of said rod, and at their lower ends supported by the axle of the wheel, and a seat carried by the bar, substantially as described.

MARSHALL ZACK.

Witnesses:
EDWIN L. POOR,
M. A. BRONSON.